(12) United States Patent
Hill (10) Patent No.: US 11,753,838 B1
(45) Date of Patent: Sep. 12, 2023

(54) PORTABLE TOILET

(71) Applicant: Gaylord Dean Hill, Bakersfield, CA (US)

(72) Inventor: Gaylord Dean Hill, Bakersfield, CA (US)

( * ) Notice: Subject to any disclaimer, the term of this patent is extended or adjusted under 35 U.S.C. 154(b) by 33 days.

(21) Appl. No.: 17/668,295

(22) Filed: Feb. 9, 2022

(51) Int. Cl.
  *E04H 1/12* (2006.01)
  *B61D 35/00* (2006.01)

(52) U.S. Cl.
  CPC ......... *E04H 1/1216* (2013.01); *B61D 35/007* (2013.01)

(58) Field of Classification Search
  CPC ...... E04H 1/1216; A47K 11/00; B61D 35/007
  USPC .......... 4/449, 111.6, DIG. 19, 460, 464–467, 4/476, 479, 481, 483
  See application file for complete search history.

(56) References Cited

U.S. PATENT DOCUMENTS

| | | | | |
|---|---|---|---|---|
| 460,326 A | * | 9/1891 | Ross | A47K 11/02 4/111.6 |
| 3,694,825 A | * | 10/1972 | Kufrin | A47K 11/023 4/111.6 |
| 4,096,592 A | * | 6/1978 | Clark | A47K 11/02 4/449 |
| 6,393,627 B1 | * | 5/2002 | Avila | E04H 1/1216 4/449 |

* cited by examiner

*Primary Examiner* — Tuan N Nguyen
(74) *Attorney, Agent, or Firm* — James M. Duncan; Scanlon Duncan LLP (57) ABSTRACT

A portable toilet requires no water supply and is configured to allow solid waste collection by an upper solid waste chamber having a solid waste tray slidingly disposed within the upper waste chamber. A disposable matting member is placed within the solid waste tray to collect solid waste. Liquid waste percolates through the solid waste tray and the disposable matting member into a liquid waste chamber disposed beneath the solid waste tray.

20 Claims, 14 Drawing Sheets

PORTABLE TOILET

BACKGROUND OF THE INVENTION

The need for portable toilets is well known and needs no further discussion. In general, portable toilets are self-contained units not requiring a water supply or a waste line connection. As opposed to outhouses, which are semi-permanent structures built over earthen pits, portable toilets temporarily store human waste until it can be removed. The typical portable toilets may utilize a one-piece plastic or fiberglass unit with a translucent roof to let in natural light. While the typical installation has the portable toilet mounted on a pallet for movement by forklift, some of these units may be mounted on wheels to provide additional mobility. However, in either case, the weight of the typical portable toilets requires equipment to move the structures.

The waste tanks of portable toilets also need to be emptied according to the traffic to the unit. The waste tanks are typically emptied by inserting a hose from a vacuum truck into the tank and sucking up the contents into a vacuum truck. Thus, maintaining a portable toilet typically requires that the unit be accessible by a vacuum truck. However, in some situations, such as camp sites and military bivouac sites, such access may not be available.

Conventional portable toilets utilize a liquid chemical blend comprising a blue dye which is poured into the holding tank to hide the appearance of the waste, a fragrance to mask the odor, and biocides to kill bacteria and microbes. Unfortunately, the blue dye has been known to splash out of the tank and get onto a user's skin or clothing. As another disadvantage, the temperatures inside a portable toilet can soar resulting in both very uncomfortable heat, but also increased bacterial activity, resulting in a very foul aroma.

SUMMARY OF THE INVENTION

Embodiments of the present invention provide an improved portable toilet which addresses the issues identified above. Embodiments of the invention comprise a cabinet member comprising a top and a base, with the base disposed on a floor member and with a toilet opening disposed in the top. A solid waste chamber is disposed within the cabinet member where the solid waste chamber is below the top, where the toilet opening provides a conduit into the solids waste chamber. A solid waste tray is slidingly disposed within the solid waste chamber where the solid waste tray has a perforated bottom. A liquid waste chamber disposed below the perforated bottom where the liquid waste chamber is also diposed above the base. A disposable jute matting member is disposed within the solid waste tray, wherein the disposable jute matting member is configured to catch and retain any solid waste received through the toilet opening but to allow any liquid waste to pass through the disposable jute matting member into the liquid waste chamber.

It is to be appreciated that where there is availability to have the solid wastes removed with the liquid waste, embodiments of the portable toilet may have the solid waste tray omitted or removed, thereby forming a single waste chamber which contains the solid waste and liquid waste.

Embodiments of the portable toilet may further comprise a plurality of vertical members which extend upwardly from the cabinet member and/or the floor member. Panel members may extend between the vertical members, thereby providing an enclosure around the cabinet member.

Two of the vertical members may be set within socket members which are attached to the floor member. A door member may be disposed between the two vertical members, the vertical members also referred to herein as "door posts." The door posts may be configured to support a relatively heavy door, in which case the door posts may be fabricated from metal, such as 1-inch square posts. Likewise, two vertical members may be attached to the cabinet member, typically at the rear of the cabinet, these vertical members also referred to herein as "rear posts." The rear posts may be fabricated from 1¼ inch PVC.

Panel members may span between the two rear posts. Panel members may also span between a rear post and a door post on one side and span between a rear post and a door post on the other side. The panel members may comprise an accordion configuration which allows the panel members panels to collapse, thereby facilitating the transportation and storage of the panel members. Panel members may also span between a rear post and door post on one side and a rear post and a door post on the other side. The panel members may, when combined with the door member, form a complete enclosure around the cabinet member.

The vertical members may have axial slots, where the panel members are suspended by rod members. The rod members may have ends which ride within the slots. The rod members may also attach to other structures on the vertical members, such as spaced apart apertures, hooks, or the like. Rod members may also be configured in an "X" configuration to support the panel members, with the rod members disposed between the two rear posts and between each of the rear posts and each of the door posts. A translucent roof member may attach to the plurality of the tops of the vertical members.

It is to be appreciated that the vertical members, the panel members, the rod members, etc. are configured to be collapsible to facilitate storage, transportation, assembly, and dismantling.

DETAILED DESCRIPTION OF THE INVENTION

Figure 1:
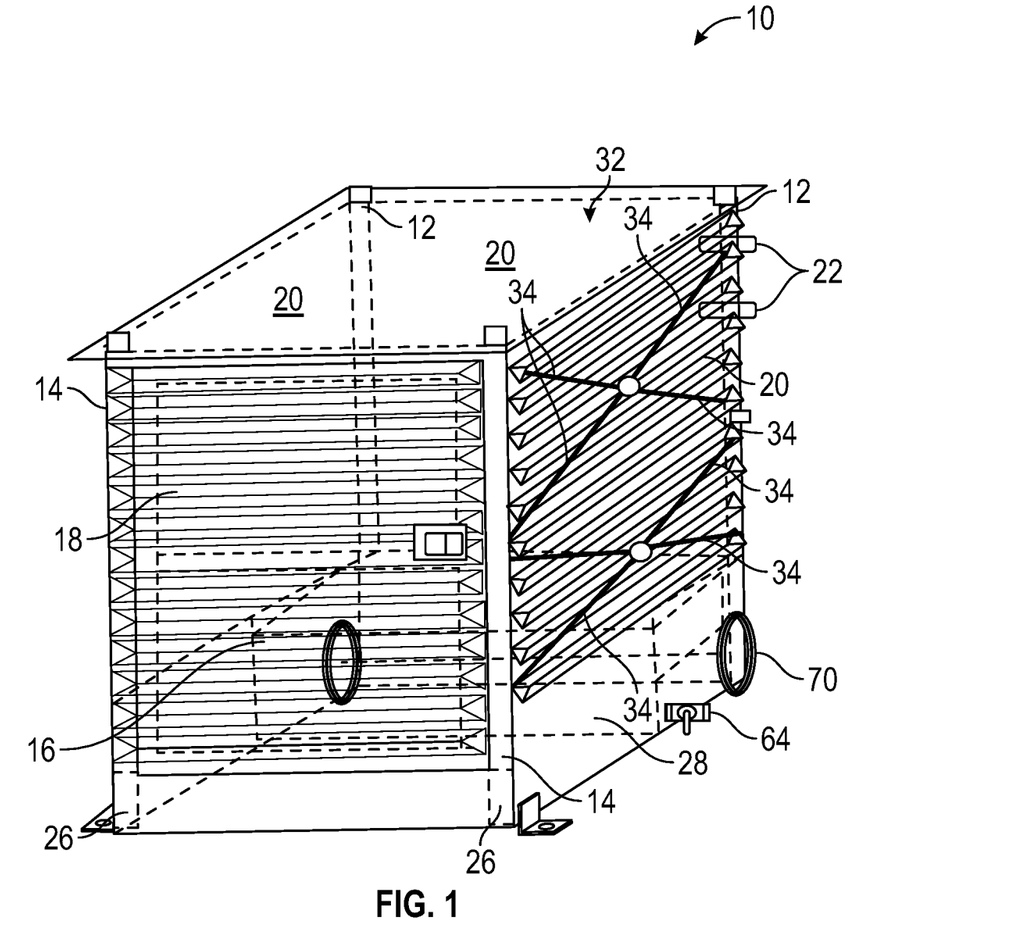
FIG. 1 depicts a perspective view of an embodiment of the disclosed portable toilet showing certain inside components in dashed line.
Figure 2:
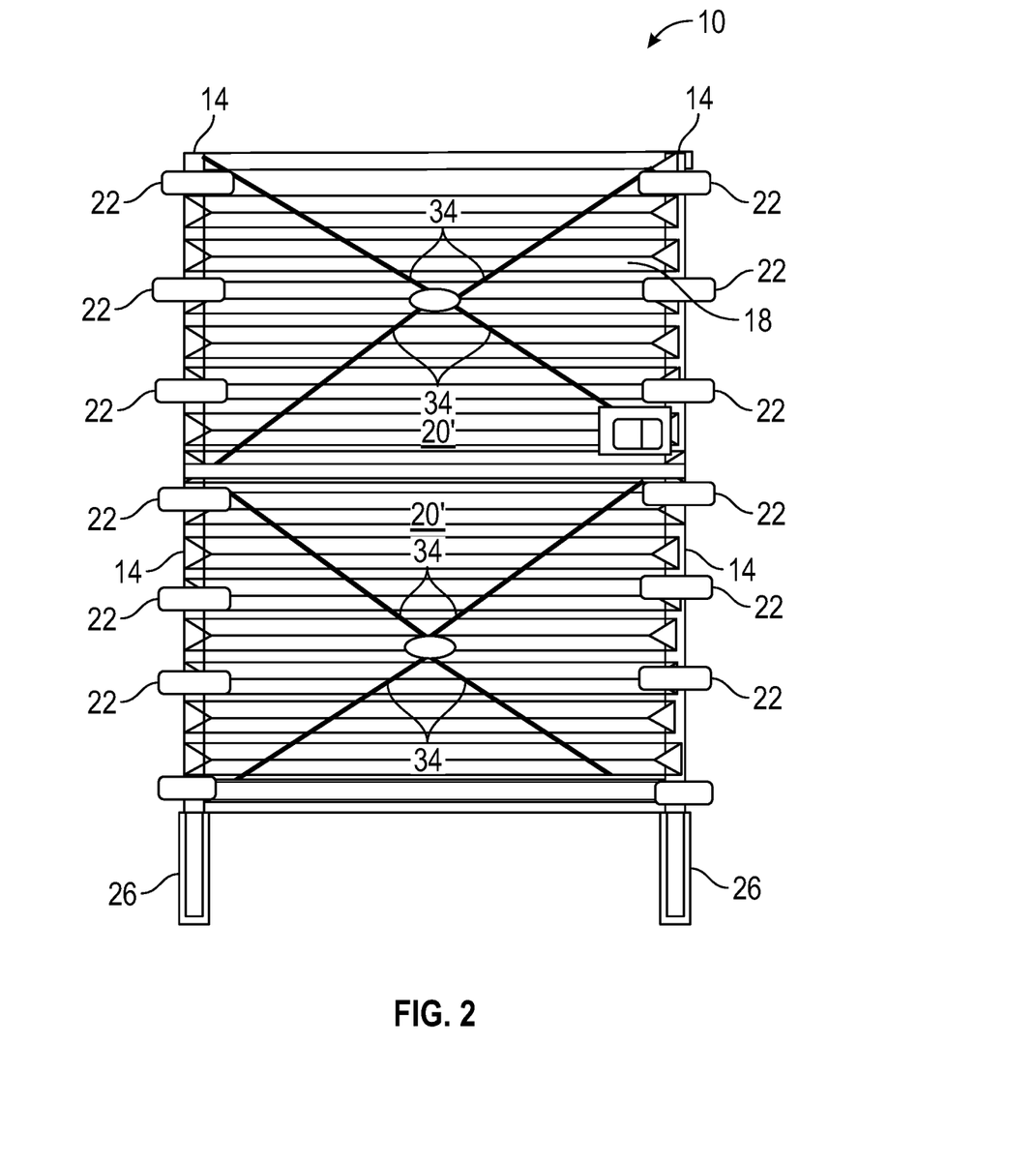
FIG. 2 depicts a front view of an embodiment of the disclosed portable toilet.
Figure 3:
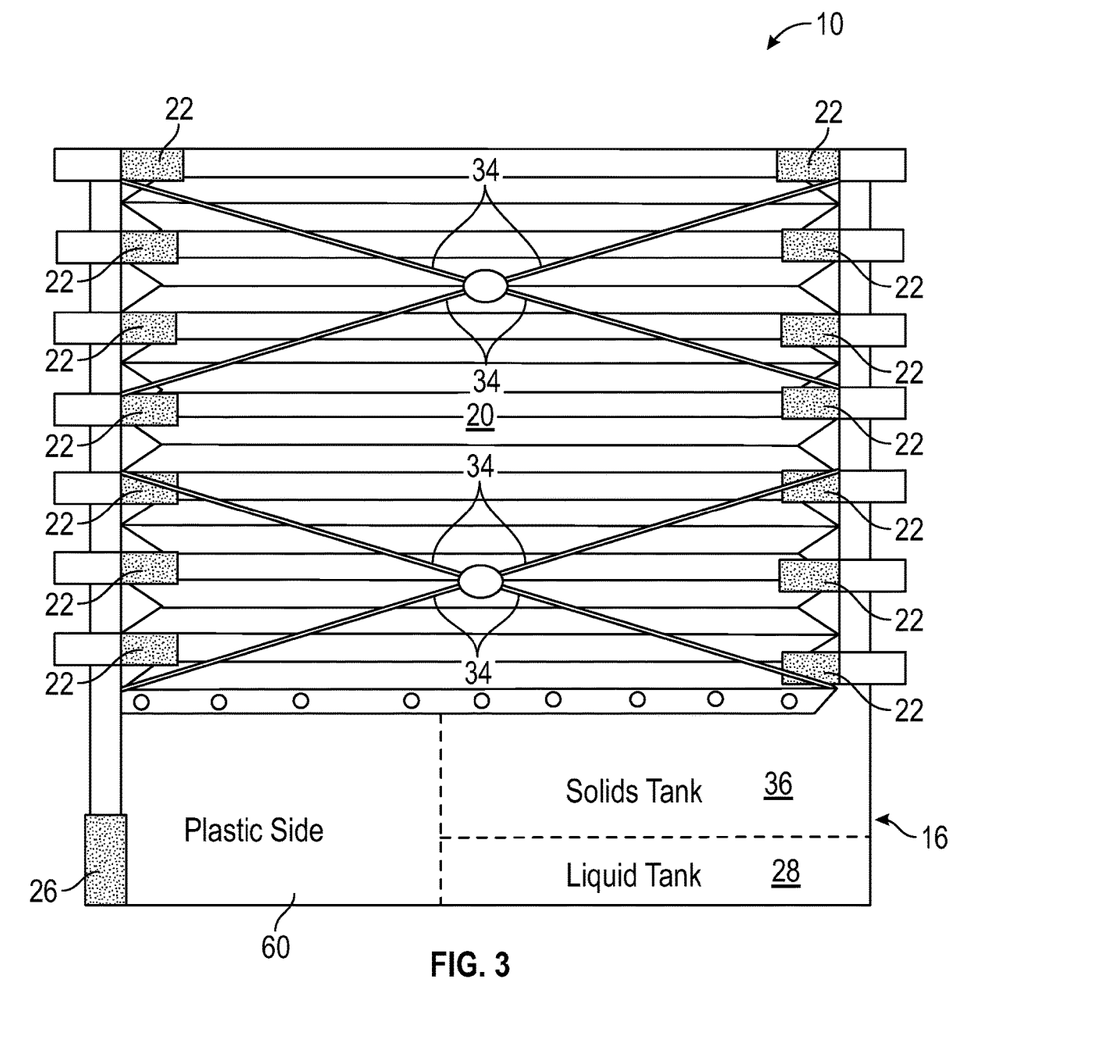
FIG. 3 depicts a side view of an embodiment of the disclosed portable toilet, showing a sectional view along line 3-3 of FIG. 2.
Figure 4:
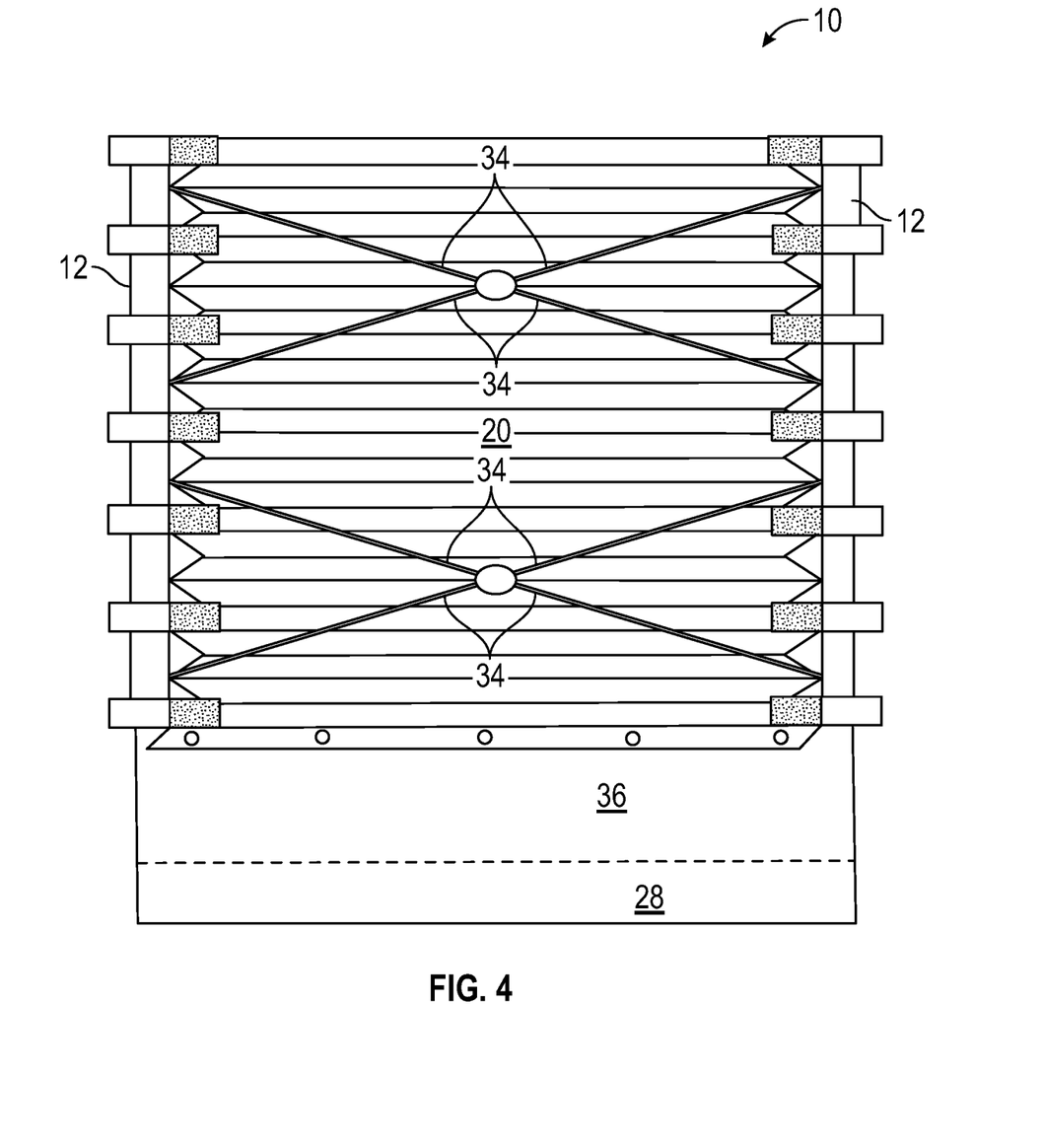
FIG. 4 depicts a rear view of an embodiment of the disclosed portable toilet.

Referring now to the Figures, an embodiment of the disclosed portable toilet 10 is depicted in a perspective view in FIG. 1, a front view in FIG. 2, a side view in FIG. 3, and a rear view in FIG. 4. Embodiments of the portable toilet 10 are assembled from relatively light-weight components which are easy to assemble and disassemble. Moreover, the use of light-weight components makes transporting and storing embodiments of the portable toilet 10 relatively easy. Embodiments of the disclosed portable toilet are mobile and configured to be transported in the back of a vehicle. Embodiments of the portable toilet 10, preferably empty, may also be manually relocated by utilizing wheels and a handle. Embodiments of the disclosed portable toilet require no water or sewage line connections and are essentially self-contained.

Figure 12:
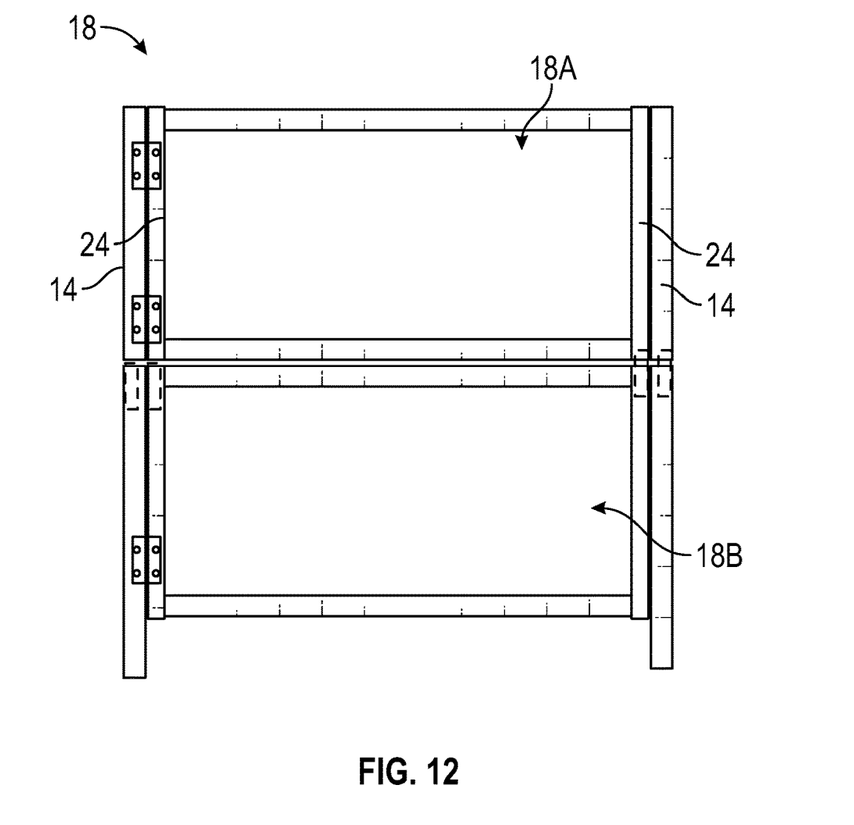
FIG. 12 depicts a door assembly which may be utilized in an embodiment of the disclosed portable toilet.

An embodiment of the portable toilet 10 may comprise rear vertical members 12 and front vertical members 14. Rear vertical members 12 may be fabricated from light-weight plastic tubes, such as 1¼ inch tubes fabricated from polyvinyl chloride (PVC) or the like which may be attached to a cabinet member 16 which is located at the back end of the apparatus. Front vertical members 14 may be fabricated from stronger materials, such as 1-inch square steel tube. The stronger materials are provided to support the weight of door member 18, which has door frame members 24 which may be fabricated from square metal tubing. Door member 18 is shown in greater detail in FIG. 12. Door member 18 may have an upper section 18A and a lower section 18B. The door frame members 24 for upper section 18A may be configured from smaller size tubing than those for the door frame members 24 for lower section 18B, thereby allowing the door frame members of the upper section 18A to fit within the door frame members 24 of the lower section 18B, thereby allowing an easy assembly of the door member 18.

Panel members 20 may extend between the two adjacent rear vertical members 12 and between a rear vertical member 12 and a corresponding adjacent front vertical member 14, thereby forming opaque walls around the back and two sides of the portable toilet 10, with the front side enclosed by the door. Panel members are lightweight but opaque for privacy. Panel members 20 may be fabricated from vinyl in an accordion configuration which are collapsible to facilitate transportation and storage. Panel members 20' may also be used for door member 18, with the panel members 20' extending between door frame members 24 front vertical members 14.

Panel members may be attached to rear vertical members 12 and front vertical members 14 with fastening members 22, such as strips of hook and loop fastener material, which may wrap around the rear vertical members 12 and the front vertical members 14. Likewise, fastening members 22 may be utilized to attach panel members 20' to the door frame members 24. The Inventor has found that four-inch-long strips are sufficiently long to attach to the panel members 20, 20' and wrap around the posts, thereby securing the panel members to the unit.

Figure 5:
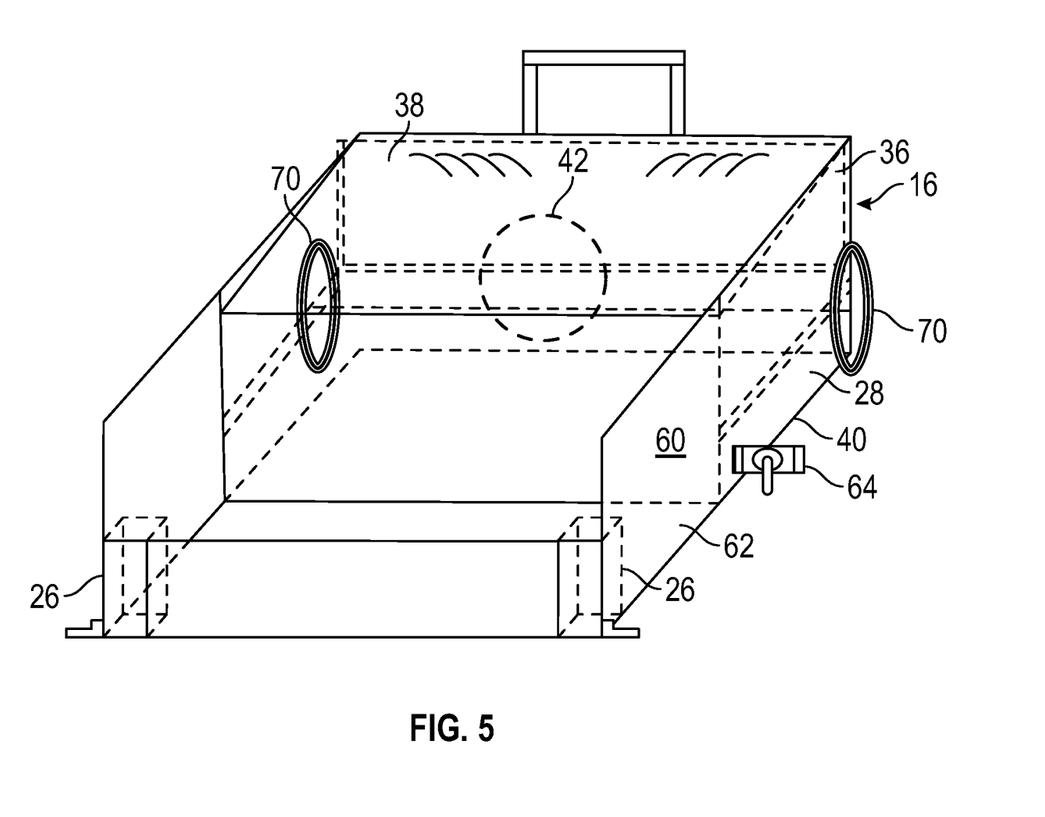
FIG. 5 shows a perspective view of a cabinet member of an embodiment of the disclosed portable toilet.
Figure 16A:
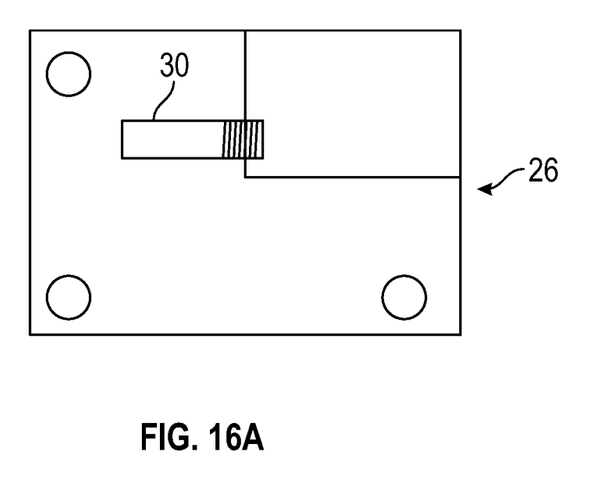
FIG. 16A depicts a top view of a socket which may be utilized for positioning a front corner post.
Figure 16B:
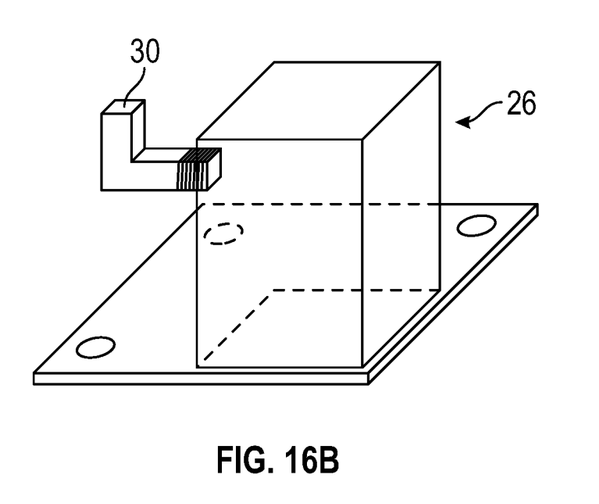
FIG. 16B depicts a perspective view of a socket which may be utilized for positioning a front corer post.

Front vertical members 14 may be seated in socket members 26 which are built into or attached to floor member 62 as best shown in FIG. 5, with the socket member either being attached to a front wall of liquid waste tank 28 or being integrated into the floor 62 of the waste tank. A detailed view of an embodiment of a socket member 26 is depicted in FIGS. 16A-16B. Socket member 26 may further comprise a locking bolt 30 which may be used to hand-tighten against a side of a front vertical member 14 during the assembly of the portable toilet 10.

Embodiments of the portable toilet 10 may further comprises a lightweight opaque roof 32, such as a clouded plexiglass, which is sufficiently translucent to allow sunlight to provide natural lighting inside the portable toilet 10. Roof 32 may have openings through which the rear vertical members 12 and front vertical members 14 extend. A seal member (not shown) may be configured to fit over and under the roof 32 to form a weathertight seal and also to provide a means of securing the roof 32 to the rear vertical members 12 and the front vertical members 14.

Panel support members 34 may be utilized to provide additional support to panel members 20, where panel support members extend between the two adjacent rear vertical members 12 and between a rear vertical member 12 and a corresponding adjacent front vertical member 14. Panel support members 34 may be configured as two rods pivotally connected at the center, where the panel support members may be opened up into an "X" configuration as shown in the Figures. The ends of the rods may be attached to each of rear vertical members 12 or to a vertical rear member and an adjacent front vertical member 14. The rear vertical members 12 and/or front vertical members 14 may have holes configured to receive the ends of the rods, or attachment clips configured to receive the ends of the rods.

Common to all embodiments of the invention is cabinet member 16 which is depicted in dashed lines in FIG. 1 and FIG. 3 and shown in greater detail in FIGS. 5, 6A, 6B, 10A, 10B and 13 As shown in FIG. 3, the cabinet member 16 comprises the liquid waste tank 28 and the upper solids tank 36 which overlies the liquid waste tank 28. Cabinet member 16 may comprise a top 38 and a base 40. A toilet opening 42 extends through top 38, the toilet opening providing a conduit into the upper solids tank 36.

Figure 6A:
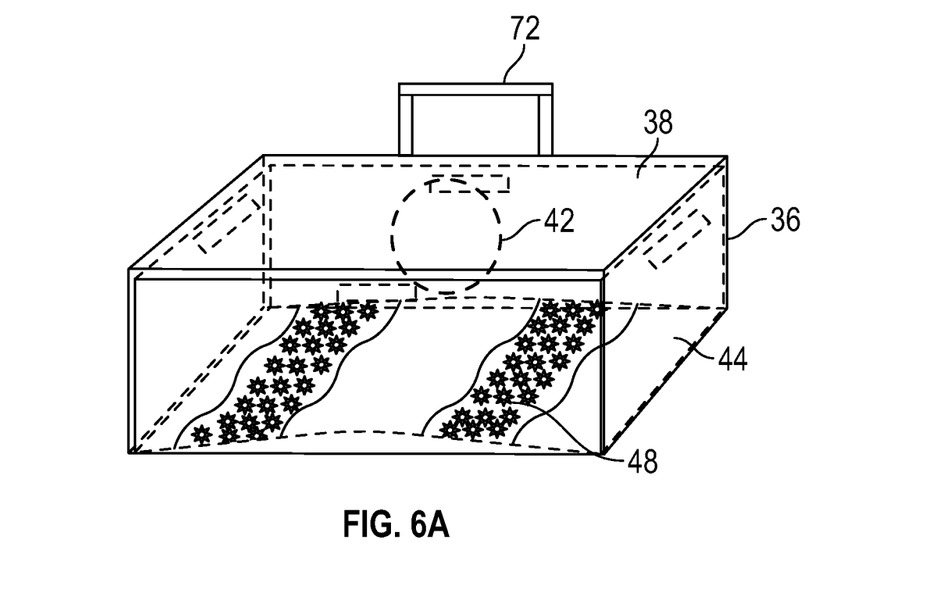
FIG. 6A shows a perspective view of an embodiment of a solid waste chamber in an embodiment of the disclosed portable toilet.
Figure 6B:
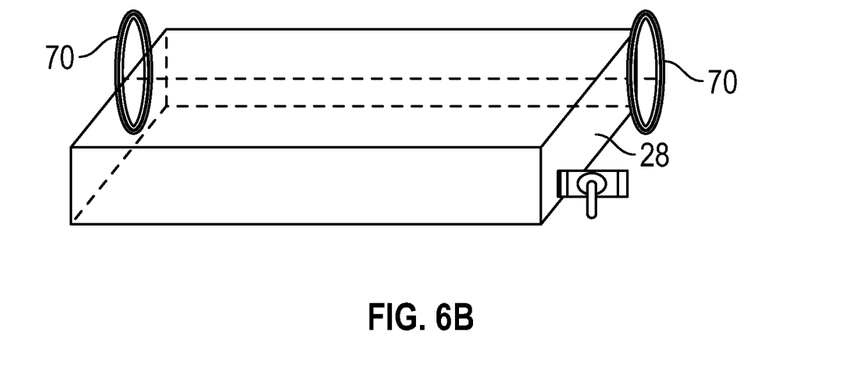
FIG. 6B shows a perspective view of an embodiment of a liquid waste chamber in an embodiment of the disclosed portable toilet.
Figure 7:
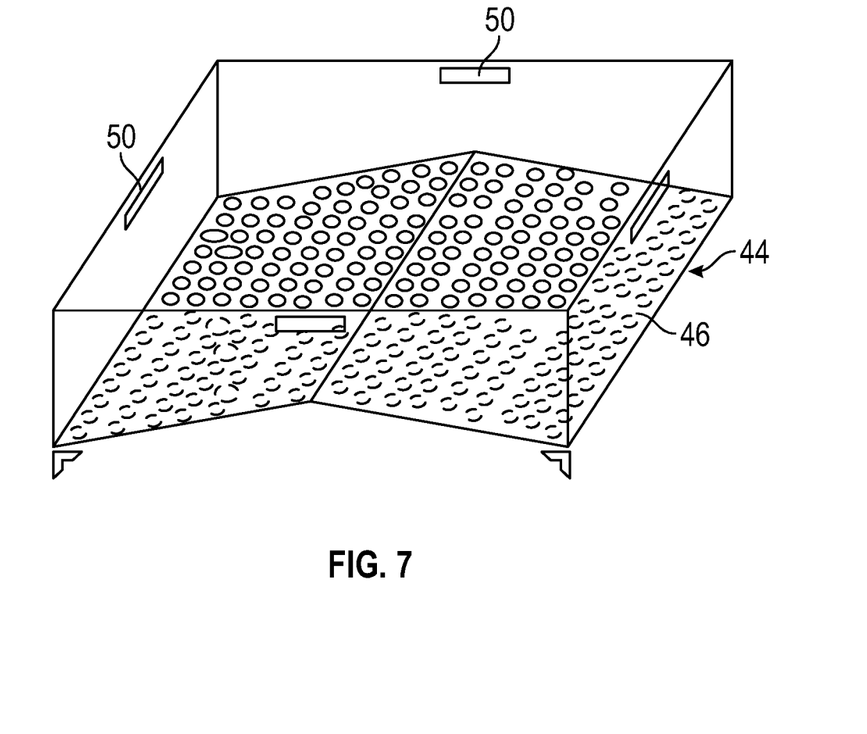
FIG. 7 shows a perspective view of an embodiment of a solid waste tray of an embodiment of the disclosed portable toilet.

FIGS. 6A and 6B show the upper solids tank 36 separated from liquid waste tank 28. A solid waste tray 44 is slidingly disposed within upper solids tank 36. A detailed view of an embodiment of a solid waste tray 44 is shown in FIG. 7. Solid waste tray 44 has a perforated bottom 46. A disposable jute matting member 48 or the like may be disposed within the solid waste tray 44. This configuration allows solid waste to be catch and retain any solid waste material received through toilet opening 42 but allowing liquid waste to percolate through the jute matting member 48 and the perforated bottom 46 and drop into liquid waste tank 28. A drain valve 64 extends into liquid waste tank 28 for draining liquid waste as required.

As shown in FIG. 7, solid waste tray 44 has handles 50 allowing it to be manually manipulated. The rear of portable toilet 10 may have a hinged door or port which allows the solid waste tray to be withdrawn from the cabinet member 16 for removal and disposal of the disposable jute matting member 48. Embodiments of the portable toilet 10 may have storage bins or slots which contain disposal bags for placement of used matting members. The storage bins may also contain disposable gloves. Door member 18 may have an interior cavity which is configured to contain a clean matting member 48. It is to be appreciated that if the solid waste tray 44 is not inserted into upper solids tank 36, solids will fall into the liquid waste tank 28, so that the portable toilet 10 may function like many other portable toilets, thereby providing additional utility as required for a particular need.

Figure 8:
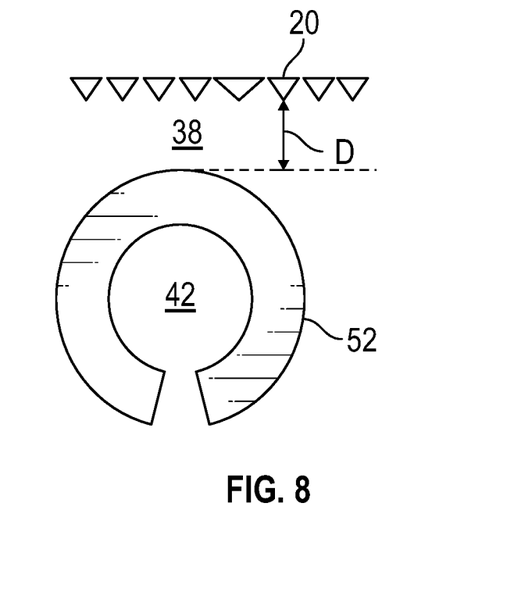
FIG. 8 depicts a top view of a toilet seat depicting the spacing between the back of the seat and the inside wall of a panel utilized in an embodiment of the disclosed portable toilet.
Figure 9A:
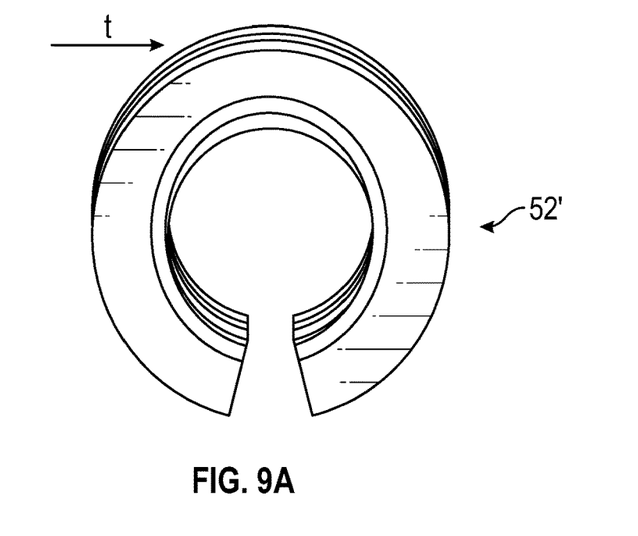
FIG. 9A depicts an embodiment of a two-part toilet seat which may be utilized in an embodiment of the disclosed portable toilet, the toilet seat having an upper part comprising urinal member which may be disposed above a lower part comprising a seat member.
Figure 9B:
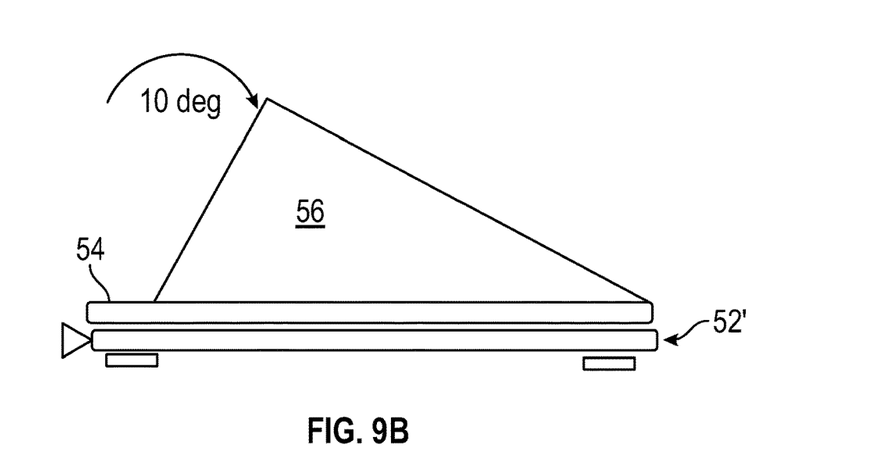
FIG. 9B depicts a side view of the two-part toilet seat of FIG. 9A.
Figure 9C:
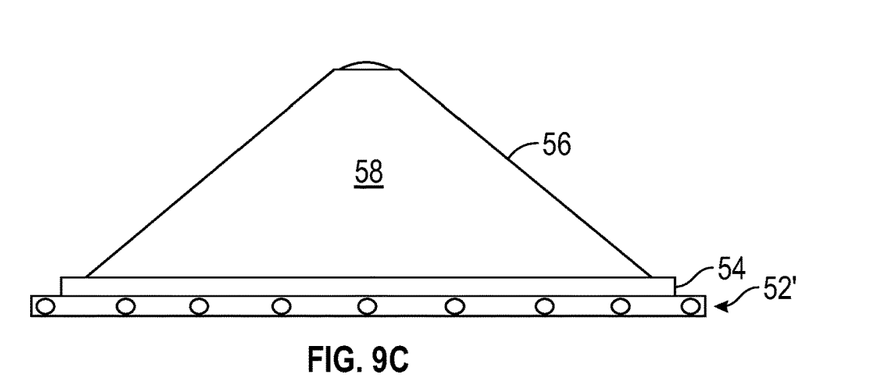
FIG. 9C depicts a front view of the two-part toilet seat of FIG. 9A.
Figure 10A:
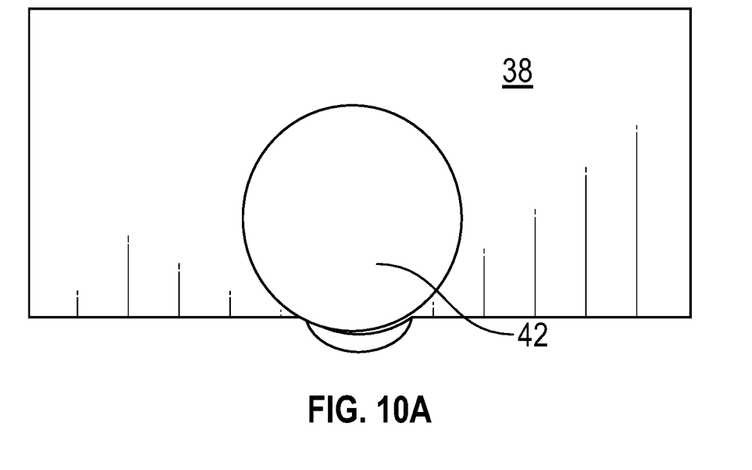
FIG. 10A depicts a top view of a two-part toilet seat attached to a top of a cabinet member of an embodiment of the disclosed portable toilet.
Figure 10B:
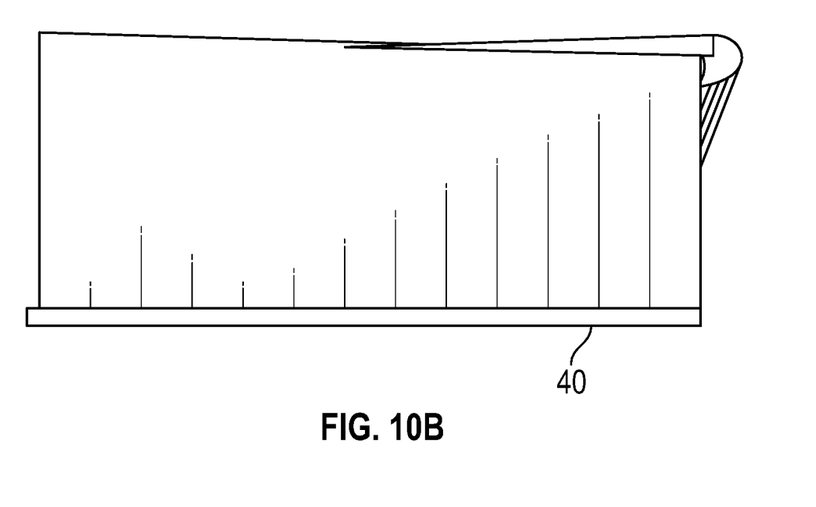
FIG. 10B depict a side view of a cabinet member of an embodiment of the disclosed portable toilet.

FIG. 8 shows a configuration of a toilet seat 52 which may be placed on top 38 over toilet opening 42. As shown in FIG. 8, toilet seat 52 may be disposed a distance D from the interior side of the panel members 20 attached at the back of the portable toilet 10. FIGS. 9A through 9C show an alternative embodiment of a toilet seat 52' which has a urinal disposed above the seat. In this embodiment, a second seat member 54 pivotingly attached to the top 38 of the cabinet member 16. The second seat member 54 has a a first position wherein the second seat member 54 is disposed in a horizontal orientation adjacent the lower toilet seat '52, as illustrated in FIGS. 9A through 9C. The second seat member 54 has a second position (not shown) where the second seat member is raised to make the lower toilet seat '52 available for a user to sit upon. In this position, the second toilet seat 54 will tilt back against the interior wall of the panel member 20. The second seat member 54 having an upper side comprising a hood 56 attached to the upper side, the hood comprising a triangular front opening 58, the hood configured to provide a urinal for a male user when the second seat member is in the first position, which is depicted in FIGS. 9B and 9C.

Figure 11:
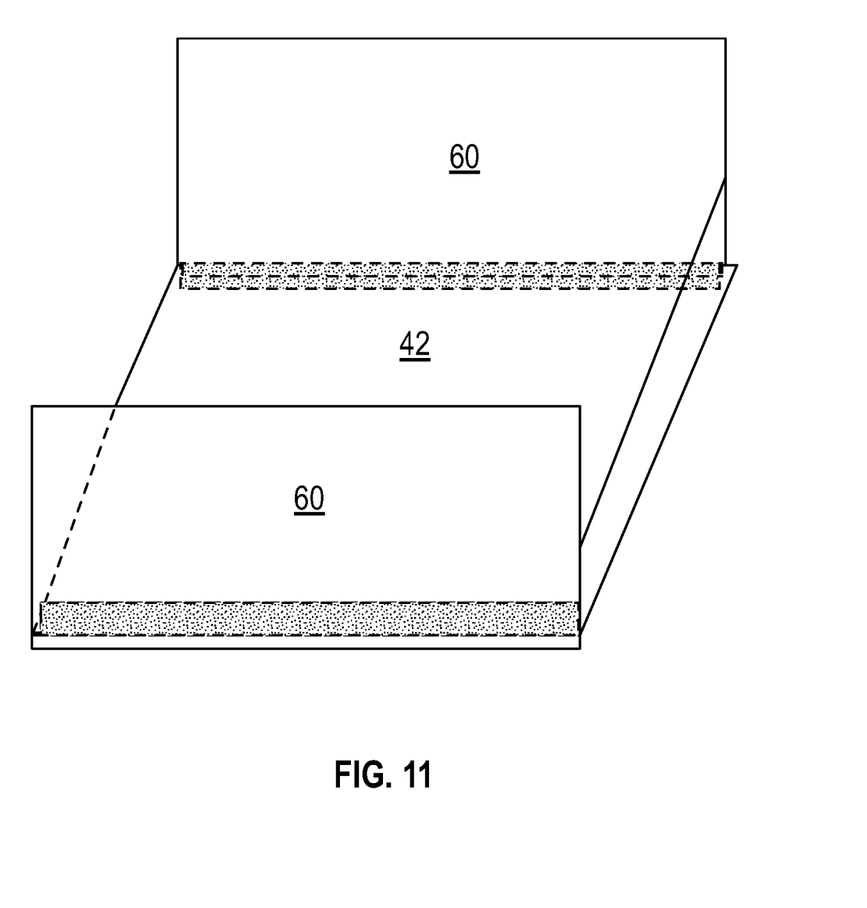
FIG. 11 depicts lower side plates and the floor of an embodiment of the disclosed portable toilet.

FIG. 11 depicts lower side plates 60 and the floor 62 of an embodiment of the disclosed portable toilet. Lower side plates 60 and the floor 62 are fabricated from a lightweight material and configured in a unitary member to facilitate storage, transport, and assembly.

Figure 13A:
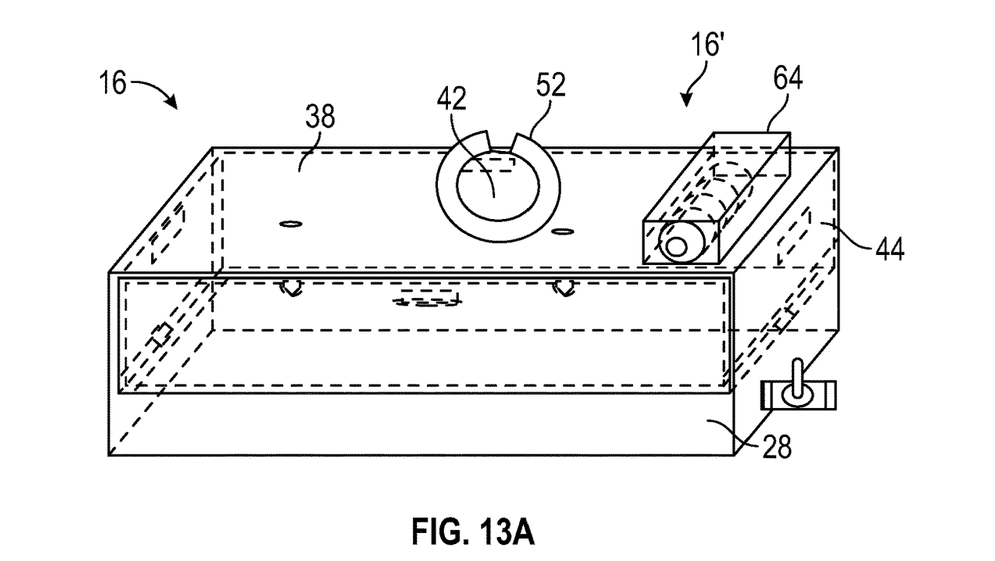
FIG. 13A depicts a cabinet of an embodiment of the disclosed portable toilet showing optional components which may be included with embodiments of the invention.
Figure 13B:
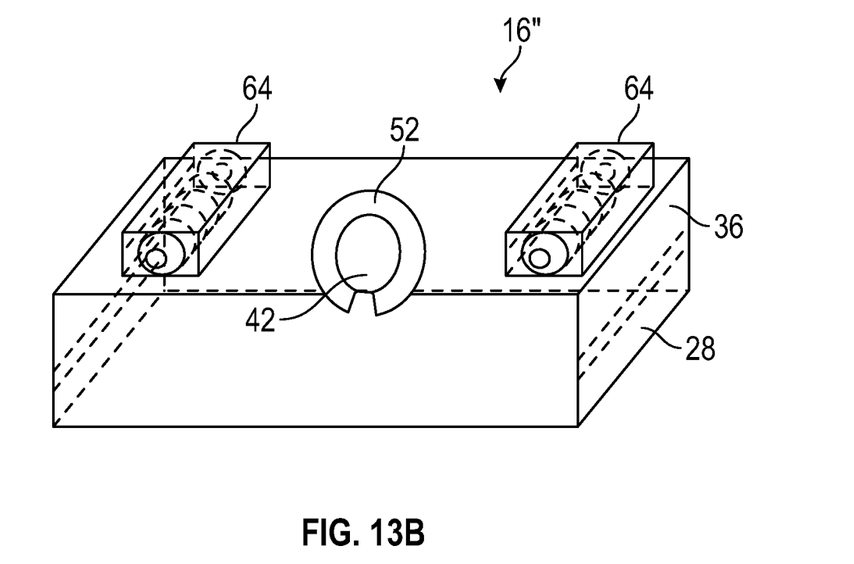
FIG. 13B depicts a cabinet of the disclosed portable toilet showing an embodiment with dual toilet paper dispensers.
Figure 14A:
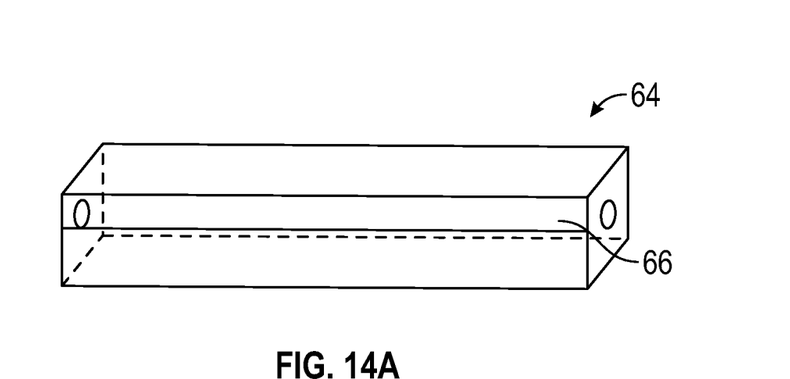
FIG. 14A shows a front view of an embodiment of a toilet paper dispenser as shown in FIGS. 13A and 13B.
Figure 14B:
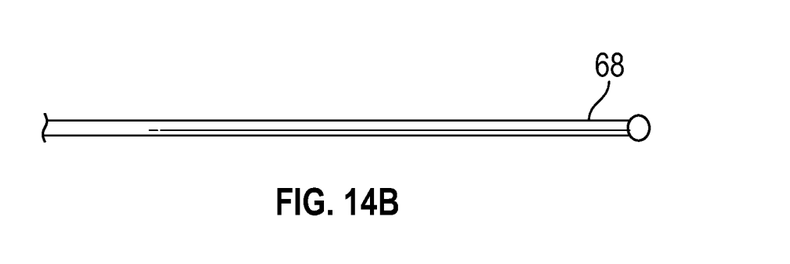
FIG. 14B depicts a roller member which may be utilized with the toilet paper dispensers shown in FIG. 14A.

FIGS. 13A and 13B show alternative embodiments of cabinet member 16', 16" which may comprise one or more toilet paper dispensers 64. As shown in greater detail in FIGS. 14A and 14B, toilet paper dispenser 64 may be comprise a box configuration with a dispensing slot 66 and a roller member 68 configured to hold multiple rolls of toilet paper. Toilet paper dispenser 64 may include a locking mechanism to prevent theft.

Figure 15A:
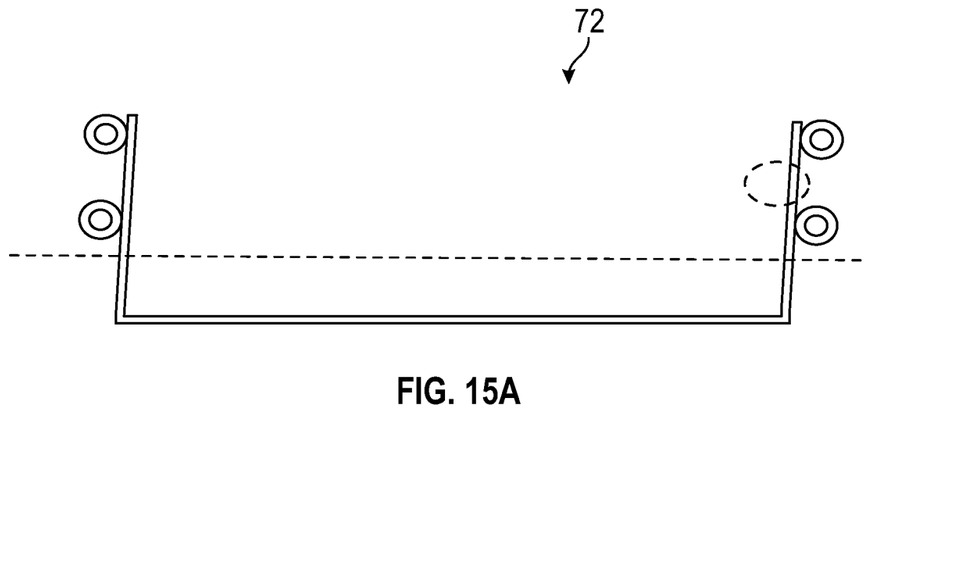
FIG. 15A depicts a top view of a handle member which may be attached to embodiments of the disclosed portable toilet.
Figure 15B:
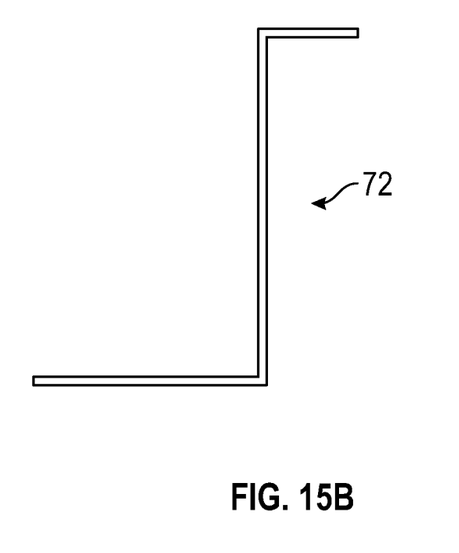
FIG. 15B depicts a side view of a handle member which may be attached to embodiments of the disclosed portable toilet.

Cabinet member 16 is the bulkiest and heaviest component of the portable toilet 10. To facilitate handling and movement of the cabinet member 16, the cabinet member may comprise wheels 70 and a handle member 72. FIGS. 15A-15B depict an embodiment of the handle member which may be attached to cabinet member 16.

Having thus described the preferred embodiment of the invention, what is claimed as new and desired to be protected by Letters Patent includes the following:

1. A portable toilet comprising:
   a cabinet member comprising a top and a base;
   a toilet opening extending through the top;
   a solid waste chamber disposed within the cabinet member, the solid waste chamber below the top, the toilet opening providing a conduit into the solids waste chamber;
   a solid waste tray slidingly disposed within the solid waste chamber, the solid waste tray comprising a perforated bottom;
   a liquid waste chamber disposed below the perforated bottom, the liquid waste chamber above the base; and
   a disposable jute matting member disposed within the solid waste tray, wherein the disposable jute matting member is configured to catch and retain any solid waste received through the toilet opening but to allow any liquid waste to pass through the disposable jute matting member into the liquid waste chamber.

2. The portable toilet of claim 1 further comprising a plurality of vertical members extending upwardly from the cabinet member and/or from a floor member.

3. The portable toilet of claim 2 further comprising panel members extending between the vertical members, thereby providing an enclosure around the cabinet member.

4. The portable toilet of claim 1 comprising a first socket member attached to a first front side of the floor member and a second socket member attached to a second front side of the floor member, wherein a first vertical member is disposed in the first socket member and a second vertical member is disposed in the second socket member, and a door member is disposed between the first vertical member and the second vertical member.

5. The portable toilet of claim 2 wherein the panel members comprise an accordion configuration, allowing the panel members to collapse.

6. The portable toilet of claim 2 comprising a roof member which attaches to the plurality of vertical members.

7. The portable toilet of claim 1 comprising wheel members attached to the cabinet member.

8. The portable toilet of claim 1 further comprising a first seat member attached to the top, the first seat member disposed over the toilet opening.

9. The portable toilet of claim 8 further comprising a second seat member pivotingly attached to the top, the second seat member having a first position wherein the second seat member is disposed in a horizontal orientation adjacent the first seat member, the second seat member having a second position wherein the second seat member is raised thereby making the first seat member available for a user to sit upon, the second seat member having an upper side comprising a hood attached to the upper side, the hood comprising a triangular front opening, the hood configured to provide a urinal for a male user when the second seat member is in the first position.

10. The portable toilet of claim 1 further comprising a valve attached to the liquid waste chamber configured to allow draining or vacuuming of liquid waste from the liquid waste chamber.

11. The portable toilet of claim 1 further comprising tie-down members configured to secure the portable toilet to a ground surface.

12. The portable toilet of claim 5 wherein the panel members comprise a vinyl material.

13. The portable toilet of claim 12 wherein the panel members are attached to the plurality of vertical members by a plurality of hook and loop fasteners.

14. The portable toilet of claim 1 further comprising a toilet paper dispenser disposed on the top.

15. The portable toilet of claim 1 wherein the cabinet member comprises a back wall, the back wall comprising a door member configured to allow access and removal of the solid waste tray.

16. A method of collecting human waste comprising the following steps:
   setting up a portable toilet according to claim 15;
   collecting a solid waste from a user upon the disposable jute matting member;
   collecting a liquid waste from the user within the liquid waste chamber;
   opening the door member;
   sliding out the solid waste tray from the solid waste chamber; and
   disposing of the disposable jute matting member.

17. A portable toilet comprising:
   a cabinet member comprising a top, a base, a front, a front wall, a back wall, a first side wall and a second side wall;
   a toilet opening extending through the top;
   a solid waste chamber disposed within the cabinet member, the solid waste chamber disposed below the top, the toilet opening providing a conduit into the solid waste chamber;
   a solid waste tray slidingly disposed within the solid waste chamber, the solid waste tray comprising a perforated bottom;
   a liquid waste chamber disposed below the perforated bottom, the liquid waste chamber above the base;
   a disposable jute matting member disposed within the solid waste tray, therein the disposable jute matting member is configured to catch and retain any liquid waste to pass through the disposable jute matting member into the liquid waste chamber;
   a door member disposed in the back wall, the door member configured to allow access and removal of the solid waste tray;
   a plurality of vertical members extending upwardly from the cabinet member; and
   a plurality of panel members extending between the vertical members, thereby providing an enclosure around the cabinet member.

18. The portable toilet of claim 17 further comprising a first seat member attached to the top, the first seat member disposed over the toilet opening.

19. The portable toilet of claim 18 further comprising a second seat member pivotingly attached to the top, the second seat member having a first position wherein the second seat member is disposed in a horizontal orientation adjacent the first seat member, the second seat member having a second position wherein the second seat member is raised thereby making the first seat member available for a user to sit upon, the second seat member having an upper side comprising a hood attached to the upper side, the hood comprising a triangular front opening, the hood configured to provide a urinal for a male user when the second seat member is in the first position.

20. A method of collecting human waste comprising the following steps:
   setting up a portable toilet according to claim 17;
   collecting a solid waste from a user upon the disposable jute matting member;
   collecting a liquid waste from the user within the liquid waste chamber;
   opening the door member;
   sliding out the solid waste tray from the solid waste chamber; and
   disposing of the disposable jute matting member.

\* \* \* \* \*